(12) United States Patent
Motoi et al.

(10) Patent No.: US 6,882,463 B2
(45) Date of Patent: Apr. 19, 2005

(54) PARTICLES FOR ELECTROPHORETIC DISPLAY AND ELECTROPHORETIC DISPLAY APPARATUS USING THEM

(75) Inventors: Taiko Motoi, Kanagawa (JP); Rie Ueno, Kanagawa (JP); Akiko Iimura, Tochigi (JP); Shinya Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/684,505

(22) Filed: Oct. 15, 2003

(65) Prior Publication Data

US 2004/0218252 A1 Nov. 4, 2004

(30) Foreign Application Priority Data

Oct. 15, 2002 (JP) .......................................... 2002-300269

(51) Int. Cl.$^7$ ........................ G02B 26/00; G03G 17/04; G09G 3/34
(52) U.S. Cl. .......................... 359/296; 345/107; 430/35
(58) Field of Search ............................... 359/296, 290; 345/107, 105, 1; 252/72; 430/19, 60, 32–38

(56) References Cited

U.S. PATENT DOCUMENTS

| | | |
|---|---|---|
| 3,612,758 A | 10/1971 | Evans et al. .............. 348/803 |
| RE28,360 E | 3/1975 | Evans et al. .............. 358/56 |
| 4,298,448 A | 11/1981 | Müller et al. .............. 359/296 |
| 5,914,805 A | 6/1999 | Crowley .................... 359/296 |
| 6,117,368 A | 9/2000 | Hou .......................... 252/572 |
| 6,400,492 B1 * | 6/2002 | Morita et al. .............. 359/296 |
| 6,593,950 B2 | 7/2003 | Nomura et al. ............ 347/122 |
| 6,727,881 B1 * | 4/2004 | Albert et al. .............. 345/107 |
| 2002/0088714 A1 | 7/2002 | Motoi et al. .............. 205/118 |
| 2002/0096986 A1 | 7/2002 | Motoi et al. .............. 313/310 |

FOREIGN PATENT DOCUMENTS

| | | |
|---|---|---|
| JP | 55-103527 | 8/1980 |
| JP | 8-295837 | 11/1996 |
| JP | 9-185087 | 7/1997 |
| JP | 2000-206574 | 7/2000 |

* cited by examiner

*Primary Examiner*—Scott J. Sugarman
*Assistant Examiner*—M. Hasan
(74) *Attorney, Agent, or Firm*—Fitzpatrick, Cella, Harper & Scinto (57) ABSTRACT

Electrophoretic displaying particles are provided. The particle is comprised of a resin and pigment granules enclosed therein. The pigment granules have an average particle size ranging from 0.1 $\mu$m to 20 $\mu$m, and the granule diameter distribution has two or more frequency maximums. This electrophoretic displaying particulate has high masking performance, improving the displaying contrast of the displaying device.

9 Claims, 4 Drawing Sheets

PARTICLES FOR ELECTROPHORETIC DISPLAY AND ELECTROPHORETIC DISPLAY APPARATUS USING THEM

BACKGROUND OF THE INVENTION

1. Field of the Invention

The present invention relates to particles for electrophoretic display, a liquid dispersion of the particles for electrophoretic display, and an electrophoretic displaying device utilizing migration of the electrophoretic particles.

2. Related Background Art

In recent years, with development of information instruments, needs are increasing for thin low-power-consuming displaying device as well as printing mediums, and research and development are being conducted actively for the displaying device to meet the needs.

Particularly, liquid crystal displaying devices, which utilizes change of optical properties of the liquid crystal by controlling electrically the arrangement of the liquid crystal molecules, are being actively developed and are commercialized. Colorization is also being developed for more natural display. In the colorization, color images are displayed by using color filters and liquid crystal shutters.

However, the liquid displaying devices have disadvantages that letters and characters in the image are not readily identifiable depending on the viewing angle and reflected light, and visual tension can be caused by flickering and low luminance of the light source. The disadvantages have not been cancelled effectively. Therefore, researches are being conducted for the displaying device which does not cause visual tension.

Reflection type displaying devices are promising in view of lower power consumption and less visual tension. One example is the electrophoretic displaying device disclosed in U.S. Pat. No. 3,612,758 by Harold D. Lees, et al.

Another example of the electrophoretic displaying device is disclosed in Japanese Patent Application Laid-Open No. 9-185087. This apparatus is explained below.

Figure 5A:
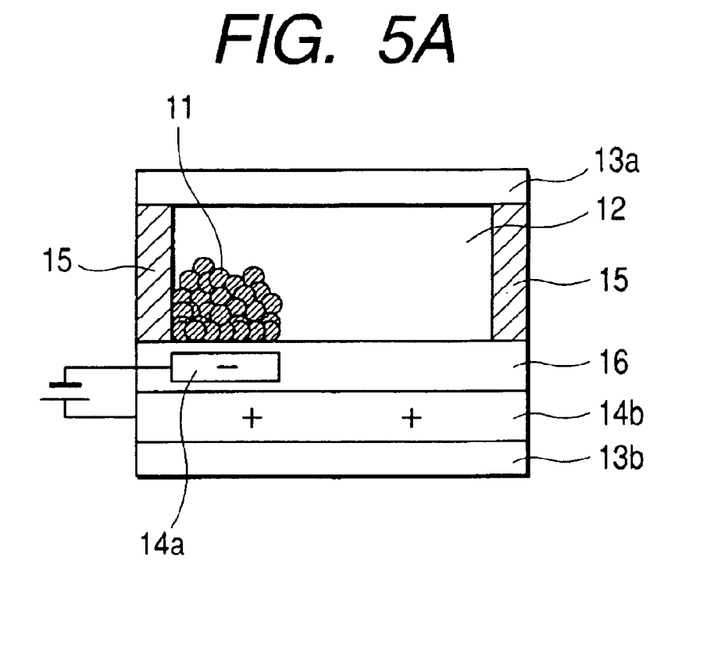
FIGS. 5A and 5B are drawing illustrating schematically a conventional electrophoretic displaying device.
Figure 5B:
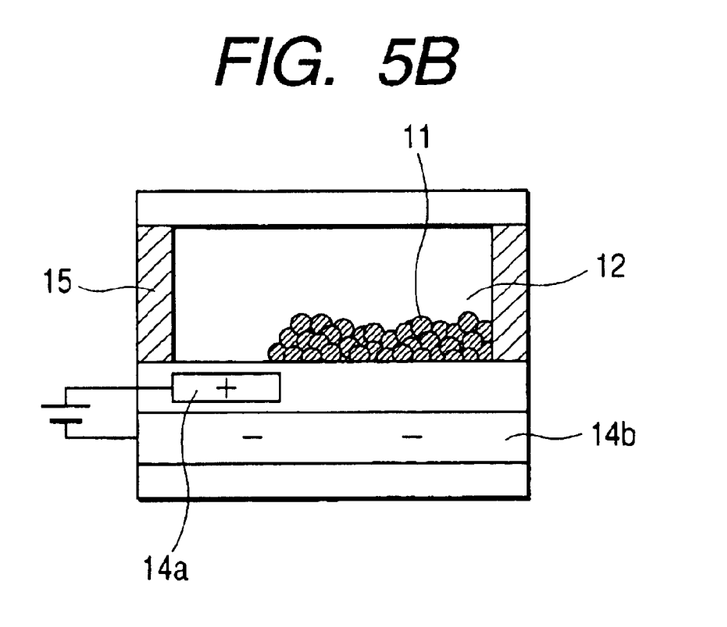

FIGS. 5A and 5B illustrate an example of the structure of the aforementioned electrophoretic displaying device. The displaying device is constituted of a pair of base plates 13a, 13b placed at a prescribed interval, dispersing medium 12 filled between base plates 13a, 13b, electrophoretic particles 11 dispersed in dispersing medium 12, and first electrode 14a and second electrode 14b placed along base plate 13b. In this apparatus, electrophoretic particles 11 are electrified positively or negatively, and are allowed to migrate by electrophoresis onto electrode 14a or 14b in accordance with the polarity of the voltage applied to electrodes 14a, 14b. Electrophoretic particles 11 and the areas where the electrodes 14a, 14b are placed are colored, thereby an image is displayed as the whole displaying device. In the drawings, the numeral 15 indicates partition walls, and the numeral 16 indicates an insulation layer.

The electrophoretic displaying device displays an image by masking the electrode with electrified electrophoretic particles. The contrast of the display can be lowered by insufficiency of the masking power of the electrophoretic particles or by the color density. Therefore, further improvement is necessary for higher display quality.

Japanese Patent Application Laid-Open No. 55-103527 discloses an electrophoretic displaying device employing a liquid electrophoretic dispersion containing white particles formed by coating titanium oxide pigment with polyethylene as a specific example of the electrophoretic particles and the electrophoretic display liquid.

U.S. Pat. No. 6,117,368 discloses black particles prepared by dyeing of white polymer particles as the electrophoretic particles.

Japanese Patent Application Laid-Open No. 2000-206574 discloses an electrophoretic displaying liquid constituted of a dyed dispersing medium and particulate pigments having different particle diameters.

On the other hand, Japanese Patent Application Laid-Open No. 08-295837 discloses pigment-containing fine polymer particles for ink-jet as a durable particulate containing a pigment.

U.S. Pat. No. 5,914,805 discloses a displaying device employing a mixture of two kinds of twist balls having different particle diameters. This apparatus improves the light reflectivity and electrode masking effect by allowing small-sized twist balls to fill the void around large-sized twist balls.

The present invention intends to provide particles for electrophoretic display (the particles hereinafter being referred to as "electrophoretic displaying particles") having a high color density and a high masking power, an electrophoretic displaying dispersion liquid containing the electrophoretic displaying particles and a dispersing medium therefor, and an electrophoretic displaying device employing the electrophoretic display dispersion liquid.

SUMMARY OF THE INVENTION

A first embodiment of the present invention is electrophoretic displaying particles comprised of a resin and pigment granules enclosed therein, having an average particle size ranging from 0.1 μm to 20 μm, wherein the granule diameter of said pigment granules has two or more frequency maximums in granule diameter distribution.

Of the two or more frequency maximums, at least one maximum for the smaller granule diameter has preferably higher frequency than the maximum for the largest granule diameter has.

The pigment granules are comprised preferably of a mixture of two or more kinds of pigment granules having different average granule diameters.

The pigment granules are preferably a mixture of two kinds of pigment granules. One pigment A has an average granule diameter ranging from 100 nm to 1 μm, and the other pigment B has an average granule diameter ranging from 5 nm to 100 nm; the mixing ratio of pigment A/pigment B ranging from 5/95 to 95/5.

The granule diameters at the two or more frequency maximums in the granule diameter distribution of the pigment granules are preferably nearly equal to the average granule diameter of the mixture of the two or more pigment having different average granule diameters.

The average granule diameter of the pigment granules ranges preferably from 0.005 μm to 6 μm.

The content of the pigment ranges preferably from 2% to 90% by weight.

The pigment granules have a relative average granule diameter of not more than 4 in comparison with the average particle size of the electrophoretic displaying particles taken as 10.

A second embodiment of the present invention is a dispersion liquid for electrophoretic display comprised of the aforementioned electrophoretic displaying particles and a dispersing medium.

A third embodiment of the present invention is an electrophoretic displaying apparatus, employing electrophoretic particles and a dispersing medium for dispersing the electrophoretic particles for conducting display by causing migration of the electrophoretic particles by application of a voltage between electrodes, wherein the electrophoretic displaying particles mentioned above are employed.

DETAILED DESCRIPTION OF THE PREFERRED EMBODIMENTS

The present invention is described below in detail. The same reference numerals or symbols are used for equivalent parts or means throughout the drawings.

The electrophoretic displaying particle of the present invention is a resin particle which encloses pigment granules. The resin particles have an average particle size ranging from 0.1 μm to 20 μm, and the pigment granules have a granule diameter distribution having at least two frequency maximums.

The embodiment of the present invention is described by reference to FIG. 1 to FIGS. 3A and 3B.

Figure 3A:
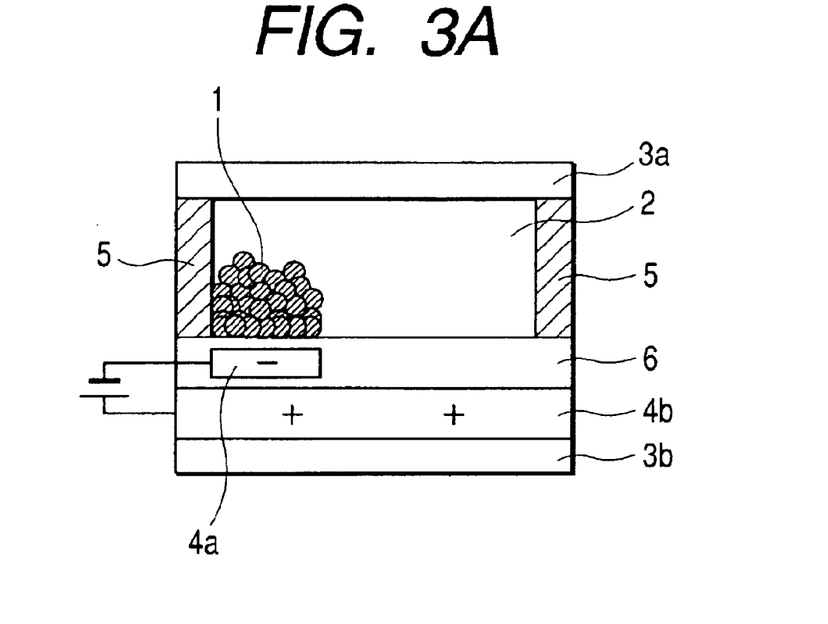
FIGS. 3A and 3B are schematic drawings showing an example of the electrophoretic displaying device of the present invention.
Figure 3B:
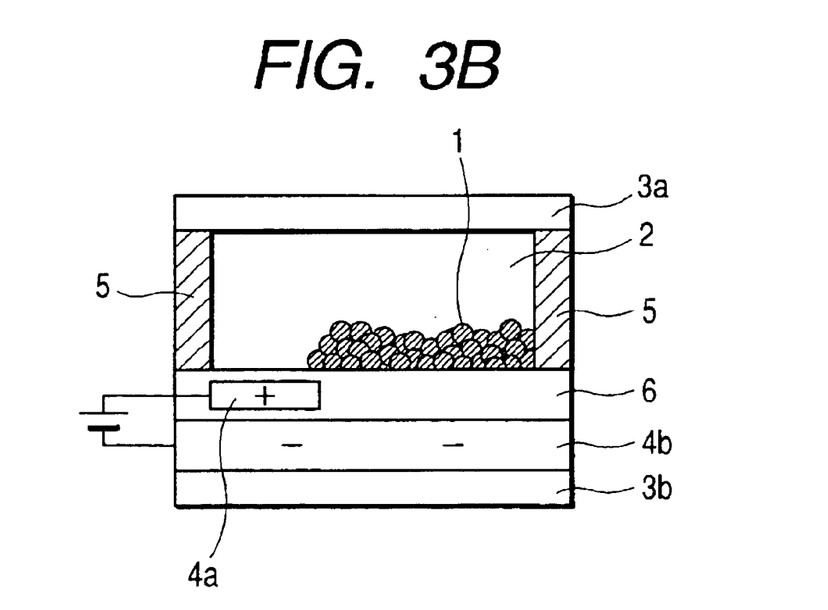

FIGS. 3A and 3B are sectional views showing schematically constitution of only one pixel of the electrophoretic apparatus of the present invention, for convenience of explanation.

The electrophoretic displaying device of the present invention uses electrophoretic displaying particles 1 dispersed in dispersing medium 2 for dispersing the electrophoretic displaying particles 1 as shown, for instance, in FIG. 3, and displays an image by application of a voltage to move the aforementioned electrophoretic displaying particles.

With this constitution, a pair of base plates 3a, 3b are placed at a prescribed interval, and the aforementioned electrophoretic displaying particles 1 and dispersing medium 2 are placed between base plates 3a, 3b. First electrode 4a and second electrode 4b are placed close to electrophoretic displaying particles 1 and dispersing medium 2. An image is formed by application of a voltage between the electrodes 4a, 4b to cause preferably migration of electrophoretic displaying particles 1.

Further, the interval between base plates 3a, 3b is preferably partitioned to form the respective pixels by partitioning walls 5.

The present invention is applicable both to horizontal migration type of electrophoretic displaying devices and to vertical migration type ones. In the horizontal migration type ones, as shown in FIGS. 3A and 3B, first electrode 4a and second electrode 4b are placed respectively along one of base plates 3a, 3b to cause migration of electrophoretic displaying particles 1 along base plate 3a, or 3b. On the other hand, in the vertical migration type ones, first electrode 4a and second electrode 4b are placed in opposition on the separate base plates to sandwich dispersing medium 2 to cause migration of electrophoretic displaying particles 1 in the direction vertical to base plates 3a, 3b (normal line direction).

The electrophoretic displaying particles 1 have an average particle size ranging from 0.1 μm to 20 μm, preferably from 0.2 μm to 15 μm. The particles of an average size of less than 0.1 μm have extremely poor handleability, whereas the particles of an average particle size of more than 20 μm can require a higher voltage for the electrophoresis, disadvantageously.

The electrophoretic displaying particles 1 of the present invention are preferably spherical or nearly spherical, or may be indeterminate in shape.

Figure 2:
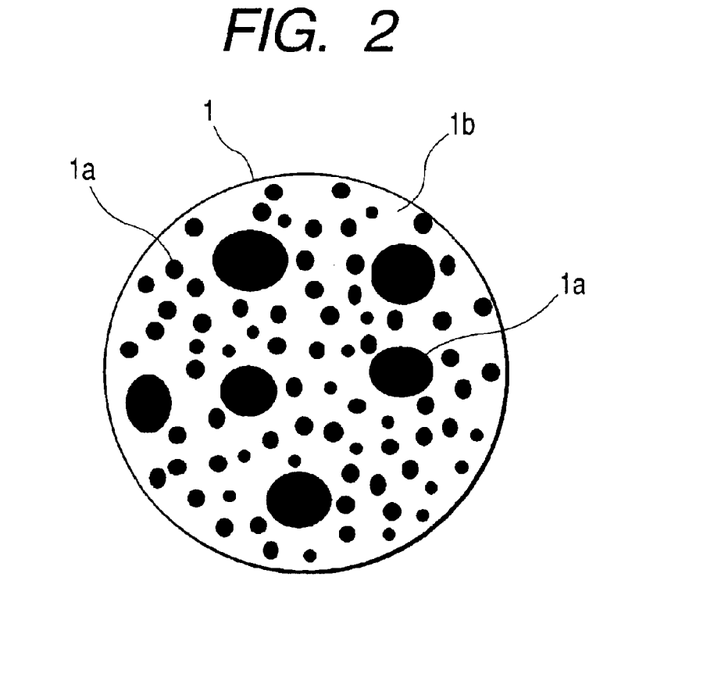
FIG. 2 is a drawing for explaining the electrophoretic displaying particle of the present invention.

The electrophoretic displaying particles 1 of the present invention are colored in accordance with the displaying method of the electrophoretic displaying device employed, and are organic polymer particles enclosing pigment granules 1a as a colorant as shown in FIG. 2.

The pigment granules 1a have a granule diameter smaller than electrophoretic displaying particles 1. The pigment granules have average granule diameter ranging from 0.005 μm to 6 μm, preferably from 0.01 μm to 5 μm.

Figure 1:
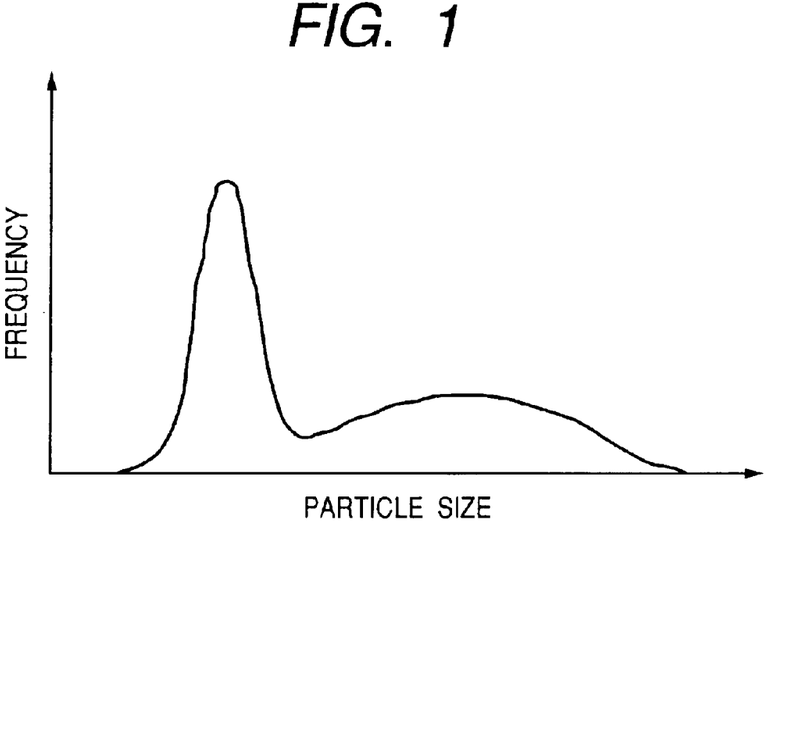
FIG. 1 is a drawing for explaining an example of granule diameter distribution of the pigment enclosed in the electrophoretic displaying particles of the present invention.

FIG. 1 shows granule diameter frequency distribution of the pigment in the present invention.

Pigment granules 1a of the present invention have two frequency maximums in the granule diameter distribution as shown in FIG. 1. The granular pigment of the present invention is roughly a mixture of a pigment of a larger granule diameter and a pigment of a smaller granule diameter. Generally, the mixture may have more than two frequency maximums, although FIG. 1 shows two frequency maximums.

Further, in the diameter distribution of the pigment granules in the present invention, the granule group of a larger size has a frequency maximum lower than that of the granule group of smaller size. Generally, of the two or more frequency maximums, the frequency maximum of the smaller granule group is higher than that of the largest granule group.

The granule diameter frequency distribution is represented by "n" as a function of granule diameter x, where n*dx is the number of the granules in the range from x to x+dx in a unit volume. Therefore the granule density N is represented by the equation:

$$N = \int_0^\infty n(x)dx$$

The average granule diameter D is defined by the equation:

$$D = \int_0^\infty xn(x)dx$$

The distribution having two frequency maximums as shown in FIG. 1 is regarded as superposition of two frequency distributions, and an average granule diameter is recognized for each of the distributions. Since the respective distributions may be assumed roughly to be Gaussian distribution, the respective average granule diameters correspond approximately to the granule diameters at the frequency maximums. Hereinafter, in the case where the granules can be regarded as a mixture of two or more groups or kinds of pigment granules, the diameter at the maximum of each of the granule groups or kinds is assumed to be an average granule diameter of that group or kind.

In an electrophoretic display employing a large pigment granule group only, the masking effect is insufficient owing to the void around the granules, whereas in the display employing a mixture of two or more groups or kinds of large and small pigment granules, the masking effect is improved owing to the small granules filling the void. For example, the void around the large spherical granules (having a diameter R) arranged in a planar close-packed state can be filled fully by twice the number of spherical granules having a diameter of R/2.

In the case where the diameter of the larger granules varies greatly with a broader frequency-distribution, the void is nonuniform. The nonuniform void space can be filled effectively by smaller granules having a diameter distribution corresponding to the void space diameter distribution. Since the void space around the uniform-sized granules has cavities of half the granule diameter in average, the void space around the nonuniform-sized granules is assumed similarly to have cavities of half the granule diameter with about half the diameter distribution breadth, and distribution of half the breadth in a double number of the granules, in average. Therefore, when the larger granules are distributed in a number density N, and has an average granule diameter <R> and a granule diameter distribution $\Delta R$, the void space can be most effectively filled with smaller granules in a number density of 2N having an average granule diameter <R>/2 and a granule diameter distribution $\Delta R/2$.

Ideally, it is preferred to use a mixture of two groups or kinds of large and small granules. Generally, the void around the granules having a largest average granule diameter of a certain frequency distribution can be decreased effectively by providing granules of a smaller average size so s to make breadth of the frequency distribution smaller and sa a result a larger maximum height, i.e. density in the frequency distribution of the granule diameter higher than those of the granules having a largest average granule diameter.

The pigment, in the present invention, is contained in electrophoretic displaying particles 1 at a content ranging preferably from 2 to 90 wt %, more preferably from 5 to 80 wt %. Further, the pigment granules 1a has a relative average granule diameter of less than 4, preferably in the range from 0.01 to 3.5 in comparison with the average sizes of the electrophoretic displaying particles 1 taken to be 10.

The granule diameters and the average granule diameter of the pigment are adjusted to fall into the defined range of the present invention, as necessary, by classifying the pigment into groups or kinds and mixing the groups or kinds of pigment granules having necessary frequency distributions. The pigment having two or more frequency maximums may be constituted of one kind of pigment having two or more frequency maximums, or may be constituted of different kinds of pigments having respectively maximums, or a mixture thereof.

The granule diameter and granule diameter distribution of the source pigment can be measured by light scattering as volumetric particle size. After preparation of the electrophoretic particle, the particle diameters of the electrophoretic particles can be measured by light scattering, and the granule diameters of the pigment enclosed in the electrophoretic particles can be measured by X-ray method, electron-microscopy or a like method.

The pigment having at least two frequency maximum of the granule diameters is preferably prepared by mixing two or more groups or kinds of a pigment or pigments having different average granule diameters in the present invention.

For example, a preferred mixture is comprised of two groups or kinds of pigment granules: one pigment A having an average granule diameter in the range from 100 nm to 1 $\mu$m, preferably from 100 nm to 0.8 $\mu$m; the other pigment B having an average granule diameter in the range from 5 nm to 100 nm, preferably from 10 nm to 100 nm; and the mixing ratio of pigment A/pigment B ranging preferably from 5/95 to 95/5.

The material of pigment granules 1a used as electrophoretic display particles 1 in the present invention may be an inorganic pigment, an organic pigment, or a mixture thereof, but is not particularly limited. A composite pigment comprised of an inorganic pigment and an organic pigment may be used therefor.

The useful inorganic pigment includes titanium oxide, zinc white, graphite, iron black, yellow lead, cobalt blue, carbon black, silica, and alumina.

The useful organic pigment includes pigments such as phthalocyanine black, nigrosine, aniline black, perylene black, furnace black, aniline blue, chalcoyl blue, chrome yellow, ultramarine blue, DuPont oil red, Irgazine red, quinacridone red, Lake red, Brilliant carmine, madder lake, quinoline yellow, chrome yellow, benzidine yellow, Hanza yellow, naphthol yellow, tartrazine, methylene blue chloride, phthalocyanine blue, methylene blue, Victoria blue, aniline blue, ultramarine blue, malachite green oxalate, phthalocyanine green, lamp black, Rose bengal, C.I. Pigment Red, C.I. Pigment Yellow, C.I. Pigment Blue, C.I. Direct Red 1, C.I. Direct Red 4, C.I. Acid Red 1, C.I. Basic Red 1, C.I. Mordant Red 30, C.I. Direct Blue 1, C.I. Direct Blue 2, C.I. Acid Blue 9, C.I. Acid Blue 15, C.I. Basic Blue 3, C.I. Basic Blue 5, C.I. Mordant Blue 7, C.I. Direct Green 6, C.I. Basic Green 4, C.I. Basic Green 6, cadmium yellow, mineral fast yellow, naval yellow, naphthol yellow S, Hansa yellow G, Permanent yellow NCG, tartrazine lake, molybdenum orange, Permanent orange GTR, benzidine orange G, cadmium red, Permanent red 4R, Watching red calcium salt, Brilliant carmine 3B, Fast violet B, methyl violet lake, cobalt blue, alkali blue lake, Victoria blue lake, quinacridone, rhodamine 6G lake, rhodamine B, fast sky blue, Pigment green B, malachite green lake and final yellow green G; and pigments such as Orient oil black (Orient Chemical Co.); Sumikaron Brilliant Blue and Sumikaron Violet (Sumitomo Chemical Co.); Kayacryl Black, Kayalon Polyester Blue, Kayalon Polyester Red (Nippon Kayaku Co.); Special Black 550 (Degussa Co.); Raven 410, 1250, etc. (Colombian Carbon Co.); and BY-004 (Mitsubishi Material Co.).

The pigment granules 1a of the present invention can be produced by classifying the granules prepared by granulation, pulverization, or a sol-gel process, but the production process is not specially limited.

The pigment used in the present invention may be prepared by mixing two or more colors, and adding a dye, if necessary, to meet the required color characteristics.

The electrophoretic displaying particle 1 is constituted of a polymer 1b and pigment granules 1a enclosed therein. The electrophoretic displaying particles 1 may be produced by a known process such as suspension polymerization, deposition polymerization, dispersion polymerization, miniemulsion polymerization, and coacervation, but the process is not limited thereto.

The monomer for the polymer for constituting the electrophoretic displaying particles is not limited, provided that the monomer is capable of forming electrophoretic displaying particles 1 enclosing the pigment 1a of the present invention. The monomer includes specifically unsaturated carboxylic acids such as acrylic acid, methacrylic acid, itaconic acid, and maleic acid; alkyl acrylate esters and alkyl methacrylate esters such as methyl acrylate, methyl methacrylate, ethyl acrylate, n-butyl acrylate, ethyl acrylate, n-butyl methacrylate, ethyl methacrylate, n-butyl acrylate, ethyl methacrylate, n-butyl methacrylate, isobutyl acrylate, isobutyl methacrylate, and 2-ethylhexyl acrylate; acrylate esters and methacrylate esters such as hydroxyethyl acrylate, hydroxylethyl methacrylate, hydroxypropyl acrylate, hydroxypropyl methacrylate, phenyl acrylate, phenyl methacrylate, 3-chloro-2-hydroxypropyl acrylate, 3-chloro-2-hydroxypropyl methacrylate, 2-chloroethyl acrylate, 2-chloroethyl methacrylate, cyclohexyl acrylate, cyclohexyl methacrylate, tetrahydrofurfuryl acrylate, tetrahydrofurfuryl methacrylate, stearyl acrylate, sterayl methacrylate, lauryl acrylate, lauryl methacrylate, glycidyl acrylate, glycidyl methacrylate, dimethylaminoethyl acrylate, dimethylaminoethyl methacryalte, diethylaminoethyl acrylate, diethylaminoethyl methacrylate, tetrahydrofurfuryl acrylate, and tetrahydrofurfuryl methacrylate; acrylamide derivatives and methacrylamide derivatives such as acrylamide, methacrylamide, N,N-dimethylacrylamide, and N,N-dimethylmethacrylamide; styrene and alkyl- or halogen-substituted styrenes such as styrene, methylstyrene, α-methylstyrene, chlorostyrene, and chloromethylstyrene; vinyl esters such as vinyl acetate, and vinyl propionate; vinyl ethers such as methyl vinyl ethers, ethyl vinyl ethers, n-propyl vinyl ethers, isobutyl vinyl ethers, and n-butyl vinyl ethers; allyl alcohol and esters or ethers thereof; and other vinyl compounds such as acrylonitrile, methacrylonitrile, vinylsulfonic acid, p-styrenesulfonic acid, vinylpyridine, vinylpyrrolidone, acrylonitrile, methacrylonitrile, vinyl chloride, vinylidene chloride, vinyl fluoride, vinylidene fluoride, ethylene, propylene, isoprene, chloroprene, butadiene, N-methylolacrylamide, N-methylolmethacrylamide, glycidyl allyl ether, γ-methacryloxypropyltrimethoxysilane, vinyltriacetoxysilane, and vinyltrimethoxysilane. These monomers may be used singly or in combination of two or more thereof.

The polymerization initiator for the aforementioned monomers includes azo type polymerization initiators such as 2,2'-azobisisobutyronitrile, 2,2'-azobis(2,4-dimethylvaleronitrile), 4,4-azobis(4-cyanopentanoic acid), and 2,2'-azobis(2-methyl-N-phenylpropionamidine) dihydrochloride;

peroxide type polymerization initiators such as lauroyl peroxide, cumene hydroperoxide, t-butyl hydroperoxide, di-t-butyl peroxide, benzoyl peroxide, diisopropyl peroxy dicarbonate, t-butyl peroxy isobutyrate, hydrogen peroxide, potassium persulfate, and ammonium persulfate; systems of combination of any of the above initiator with a reducing agent such as an amine, and sodium hydrogensulfite. A chain transfer agent may be additionally used. The polymerization initiator is used suitably for the polymerization process, the monomer, and the polymerization solvent.

The polymerization solvent is suitably selected for the polymerization process, the monomer, and the polymerization solvent. The solvent includes specifically alcohols such as methanol, ethanol, propanol, ethylene glycol, diethylene glycol, propylene glycol, and glycerin; esters such as methyl formate, ethyl formate, methyl acetate, ethyl acetate, ethylene glycol monoacetate, and diethylene glycol monoacetate; ethers and ether-alcohols such as diethyl ether, dioxane, tetrahydrofuran, ethylene glycol monomethyl ether, diethylene glycol monomethyl ether, ethylene glycol monoethyl ether, and diethylene glycol monoethyl ether; ketones such as acetone, methyl ethyl ketone, and methyl isobutyl ketone; hydrocarbons such as hexane, cyclohexane, octane, benzene, toluene, and xylene; halogenated hydrocarbons such as chloroform, carbon tetrachloride, 1,2-dichloroethane, chlorobenzene, dichlorobenzene, and chlorotoluene; nitrogen-containing compounds such as acetonitrile, dimethylamine, monoethanolamine, dimethylformamide, pyridine, and nitrobenzene; sulfur-containing compounds such as carbon disulfide, and dimethyl sulfoxide; and water. These solvent may be used singly or in combination of two or more thereof.

A dispersant, an emulsifier, or a suspending agent, and an adjuvant therefor may be suitably selected and added in a suitable amount, depending on the polymerization process, the monomer, the initiator and the polymerization solvent. Further, a stabilizer may be used to obtain the polymerization product in a state of spherical particles without flocculation, deformation or fusion-bonding. The electrophoretic displaying particles comprised of pigment granules 1a and polymer 1b may be treated for classification to adjust the particle diameters and average particle size.

Dispersing medium 2, which is an insulating liquid employed in the present invention, should be transparent in a horizontal migration type pixel, and should be colored differently from the color of the electrophoretic displaying particles 1 in a vertical migration type pixel. For the coloration, a colorant is added to dispersing medium 2.

The colorant is not limited, provided that the colorant is an oil-soluble dye which is soluble in dispersing medium 2. The colorant includes specifically Oil Yellow 3G, Fast Orange G, Oil Red 5B, Oil Violet#Macrolex Blue RR, Sumiplast Green G, Oil Brown GR, Sudan Black X60, Valifast Red, Valifast Yellow, Oplas Red, Oil Scarlet (Orient Chemical Co.); Oil Blue V, Oil Green, Bright Green, Sudan IV, Sudan III (Yamato Kako Co.); Sumiplast Blue, Sumiplast Red HFG, Sumiplast Red HF4G, Sumiplast Yellow, Whiteflour B (Sumitomo Chemical Co.); Macrolex Red GS (Bayer Japan Co.); Microlis Blue, Microlis Green (Ciba Geigy Japan); Orient Oil Black (Orient Chemical Co.); Sumikaron Brilliant Blue, Sumikaron Violet (Sumitomo Chemical Co); and Kayacryl Black, Kayalon Polyester Blue, and Kayalon Polyester Red (Nippon Kayaku Co.).

Dispersing medium 2 may contain, as necessary, a charge-controlling agent, or may contain an anionic surfactant, a cationic surfactant, an amphoteric surfactant, a metal salt, a nonionic surfactant, a fluorine-containing surfactant, a block type polymer, a graft type polymer, or the like which are soluble in dispersing medium 2, singly or in combination of two or more thereof.

A high-insulating organic solvent of low conductivity is used as dispersing medium 2. The dispersing medium includes specifically aromatic hydrocarbons such as benzene, toluene, xylene, and naphthene hydrocarbons; aliphatic hydrocarbons such as hexane, cyclohexane, kerosene, paraffin hydrocarbons, and isoparaffin hydrocarbons; halogenated hydrocarbons such as chloroform, trichloroethylene, dichloromethane, trichlorotrifluoroethylene, and ethyl bromide; silicone oils, and high-purity petroleums.

The electrophoretic displaying dispersion liquid, which is a liquid dispersion comprised of a dispersing medium and electrophoretic displaying particles dispersed therein, may be enclosed in microcapsules. The enclosing process is conducted by a known process such as an in-situ process, an interfacial polymerization process, and a coacervation process. The wall material of the microcapsule is not specially limited, and includes specifically polyurethane, polyurea, polyurea-polyurethane, urea-formaldehyde resins, melamine-formaldehyde resins, polyamide, polyester, polysulfonamide, polycarbonate, polysulfonate, epoxy resins, polyacrylic ester, polymethacrylic ester, polyvinyl acetate, polyvinyl alcohol, and gelatin.

Base plates 3a, 3b may be made from a polymer film such as polyethylene terephthalate (PET), polyether sulfone (PES), polyimide (PI), polyethylene naphthalate (PEN), and polycarbonate (PC); or an inorganic material such as glass and quartz. Base plate 3a, which is placed on the observer's side, is preferably made from a material having high visible-light transmissivity and high heat resistance.

Electrodes 4a, 4b may be made from any electroconductive material which is, capable of being patterned. Indium-tin oxide (ITO) can be adduced as an example of a material for transparent electrode. In a horizontal migration type electrophoretic displaying device shown FIGS. 3A and 3B, one electrode 4b is formed over the entire pixel, and the other electrode 4a is formed at a level different from that of electrode 4b to cover a part of electrode 4b in the pixel. However, the electrode arrangement is not limited thereto. The electrodes 4a, 4b may be formed on one and the same level. In this arrangement, electrode 4b is provided in separate portions of the pixel without overlap of the electrodes 4a, 4b.

Further, insulation layer 6 is preferably formed to cover electrodes 4a, 4b and so forth. Insulation layer 6, when it is formed can prevent electric charge injection from electrodes 4a, 4b into electrified electrophoretic particles 1. Insulation layer 6 is preferably formed thin from a material which is less liable to form a pinhole. The material includes specifically highly light-transmissive resins such as polyimide resins, polyester resins, polyacrylate resins, polymethacrylate resins, polycarbonate resins, and epoxy resins.

Partition wall 5 may be formed from a polymer resin or a like material. Partition wall 5 can be formed by a process exemplified below.
(1) Application of a photosensitive resin layer, and subsequent light exposure and wet development,
(2) Formation by printing,
(3) Adhesion of a separately formed partition wall onto the base plate,
(4) Molding on the surface of the light-transmissive base plate, and so forth.

The region where either one of the aforementioned first and second electrodes is placed is preferably colored in the same color as electrophoretic displaying particles 1 and the region where the other electrode is placed is colored in a different color. For the coloration, the electrode itself may be colored, or a colored layer may be provided separately from the electrode, or an insulation layer provided on the electrode in superposition may be colored.

In such a manner, two-color display can be practiced. By displaying a different color by plural adjacent pixels, multicolor display can be practiced as a whole.

According to the present invention, electrophoretic displaying particle 1 encloses pigment granules 1a having at least two frequency maximums of granule diameter distribution in polymer 1b. Therefore, the electrophoretic displaying particles 1 are capable of displaying with high color density and stable electrophoresis characteristics.

Further, according to the present invention, electrophoretic displaying particles 1 have an average particle size of not more than 20 μm. Therefore, the voltage for the electrophoresis can be lowered to decrease the power consumption therefor.

EXAMPLES

The present invention is described more specifically by reference to examples.

Granular pigments B, W, R, G, Bu, Y, M, and C were prepared which have two or more maximums in granule diameters. Also were prepared two resin dispersion liquids A and B, and mixture liquid C.

<Granular Pigment B>

A portion of 50 weight parts of carbon black (Mitsubishi Chemical Co.: average particle size=30 nm) and a portion of 50 weight parts of organic black pigment, Paliogen Black L0084 (BASF Co., average particle size=200 nm), were mixed. The measurement of the granule diameter by a particle-size tester (Horiba Co., CAPA-700) showed that the mixture had two frequency maximums as shown in FIG. 1. The higher frequency maximum was found at 30 nm, and the lower frequency maximum was found at 200 nm.

<Granular Pigment W1>

Titanium oxide was wet-pulverized and repeatedly classified by sedimentation to prepare white pigment W1 having a granule diameter frequency maximum at 50 nm.

<Granular Pigment W2>

Titanium oxide was treated by filtration through filters of pore diameter of 1 μm and 0.6 μm to obtain white pigment W2 having a granule diameter frequency maximum at 0.8 μm.

<Granular Pigment R>

A portion of 45 weight parts of organic red pigment (Irgazin Red BPT, Ciba Geigy Japan Co., average particle size=10 nm) and a portion of 55 weight parts of Permanent Red BL (average particle size=500 nm) were mixed to obtain Pigment R. The granule diameter was measured in the same manner as Pigment B. Pigment R had three frequency maximums, the highest frequency maximum was at 10 nm, and other frequency maximums were at 100 nm and 500 nm.

<Granular Pigment G>

Pigment Green B was pulverized and classified. Thereby, granule fractions having average granule diameters of 30 nm and 100 nm were collected. Portions of 50 weight parts respectively of the two fractions were mixed to obtain Pigment G. The granule diameter was measured in the same manner as Pigment B. Pigment G had two frequency maximums, the higher frequency maximum was at 30 nm, and the lower frequency maximum was at 100 nm.

<Granular Pigment Bu>

Phthalocyanine Blue (Tokyo Kasei Kogyo K.K.) was pulverized and classified into fractions of 20 nm and 200 nm in average granule diameter. Portions of 50 weight parts respectively of the fractions were mixed to obtain Pigment Bu. The granule diameter was measured in the same manner as Pigment B. The resulting pigment had frequency maximums as shown in FIG. 1. The highest frequency maximum was at 20 nm, and other frequency maximum was at 200 nm.

<Examples of Other Granular Pigments>

Granular pigments Y, M, and C were obtained, in the same manner as in preparation of granular pigment Bu, respectively from Chrome Yellow, Rhodamine 6G Lake, and Ultramarine Blue.

Granular pigment Y had frequency maximums at 50 nm and 700 nm.

Granular pigment M had frequency maximums at 10 nm and 300 nm.

Granular pigment C had frequency maximums at 5 nm, 50 nm and 300 nm.

Next, resin dispersion liquids were prepared by using the aforementioned granular pigments.

<Resin Dispersion Liquid A>

A mixture of 55 weight parts of a styrene monomer and 45 weight parts of granular pigment B were mixed with a blade type stirrer for 15 hours to obtain resin dispersion liquid A.

<Resin Dispersion Liquid A1>

A mixture of 50 weight parts of a styrene monomer and 50 weight parts of granular pigment W1 were mixed with a blade type stirrer in the same manner as resin dispersion liquid A to obtain resin dispersion liquid A1.

<Resin Dispersion Liquid A2>

A mixture of 50 weight parts of a styrene monomer and 50 weight parts of granular pigment W2 were mixed with a blade type stirrer in the same manner as in preparation of resin dispersion liquid A to obtain resin dispersion liquid A2.

<Resin Dispersion Liquid AR>

A mixture of 60 weight parts of a styrene monomer and 40 weight parts of granular pigment R were mixed with a blade type stirrer in the same manner as in preparation of resin dispersion liquid A to obtain resin dispersion liquid AR.

<Resin Dispersion Liquid AG>

Resin dispersion liquid AG was prepared in the same manner as in preparation of resin dispersion liquid AR except that granular pigment R was replaced with granular pigment G.

<Resin Dispersion Liquid ABu>

Resin dispersion liquid ABu was prepared in the same manner as in preparation of resin dispersion liquid AR except that granular pigment R was replaced with granular pigment Bu.

<Other Resin dispersion Liquids>

Resin dispersion liquid AY, resin dispersion liquid AM and resin dispersion liquid AR were prepared respectively in the same manner as in preparation of resin dispersion liquid AR except that granular pigment R was replaced with granular pigment Y, granular pigment M and granular pigment C, respectively.

<Dispersion Liquid B>

A mixture of 40 weight parts of calcium carbonate and 60 weight parts of water was mixed by a blade type stirrer in the same manner as in preparation of resin dispersion liquid A to obtain dispersion liquid B.

<Dispersion Liquid C>

A mixture of 4.3 g of aqueous 2% Cellogen, 8.5 g of dispersion liquid B, and 50 g of aqueous 20% sodium chloride solution was deaerated by an ultrasonic dispersing machine for 10 minutes, and then agitated by an emulsifying machine to obtain dispersion liquid C.

Example 1

An example of the displaying particles containing a granular black pigment is shown below.

A 35 g portion of resin dispersion liquid A, 1 g of divinyl benzene, and 0.35 g of a polymerization initiator AIBN (azoisobutyronitrile) were mixed sufficiently and the mixture was deaerated by an ultrasonic dispersing machine for 10 minutes. This mixture was put into mixture liquid C, and emulsified by an emulsifying machine. This emulsified liquid was sealed in a bottle with a silicone plug, and deaerated sufficiently by pressure reduction. Gaseous nitrogen was introduced therein. The emulsified mixture was allowed to react at 70° C. for 10 hours to form particles. After cooling, the reaction mixture was taken out. The calcium carbonate therein was decomposed by a sufficient amount of diluted hydrochloric acid. The particles were collected by filtration and washed with water to obtain electrophoretic displaying particles 1 containing a black pigment. The obtained particles had an average particle size of 1 $\mu$m.

The electrophoretic displaying particles 1 was found to be polymer particles enclosing black pigment 1a therein as shown in FIG. 2 by electron microscopy observation.

Example 2

An example of the displaying particles containing a granular white pigment is shown below.

Electrophoretic displaying particles 1 containing a white pigment was prepared in the same manner as in Example 1 except that resin dispersion liquid A in Example 1 was replaced by 15 g of resin dispersion liquid A1 and 20 g of resin dispersion liquid A2. This electrophoretic displaying particles 1 was found to have an average particle size of 3 $\mu$m by particle size measurement. The electrophoretic displaying particles 1 were found to be polymer particles enclosing granular pigment 1a therein as shown in FIG. 2 by electron microscopy observation. Granular pigment 1a had a maximum granule diameter of about 800 nm.

Example 3

Examples of three kinds of displaying particles containing a granular color pigment of red, green, or blue are shown below.

Three kinds of displaying particles 1 were prepared in the same manner as in Example 1 except that resin dispersion liquid A was replaced by resin dispersion liquid AR, resin dispersion liquid AG, or resin dispersion liquid ABu. The electrophoretic red displaying particles 1 contained a red pigment consisting of a mixture of red pigments of average granule diameters of 10 nm and 500 nm. The electrophoretic green displaying particles 1 contained a green pigment consisting of a mixture of green pigments of average granule diameters of 30 nm and 100 nm. The electrophoretic blue displaying particles 1 contained a blue pigment consisting of a mixture of blue pigments of average granule diameters of 20 nm and 200 nm.

Example 4

Examples of three kinds of displaying particles containing a granular color pigment of yellow, magenta, or cyan are shown below.

Three kinds of displaying particles 1 were prepared in the same manner as in Example 1 except that resin dispersion liquid A was replaced by resin dispersion liquid AY, resin dispersion liquid AM, or resin dispersion liquid AC. The electrophoretic yellow displaying particles 1 contained a yellow pigment consisting of a mixture of yellow pigments of average granule diameters of 50 nm and 700 nm. The electrophoretic magenta displaying particles 1 contained a magenta pigment consisting of a mixture of magenta pigments of average granule diameters of 10 nm and 300 nm. The electrophoretic cyan displaying particles 1 contained a cyan pigment consisting of a mixture of cyan pigments of average granule diameters of 50 nm and 300 nm.

Example 5

An Example of the electrophoretic displaying apparatus using a black electrophoretic displaying particulate is shown below.

Figure 4A:
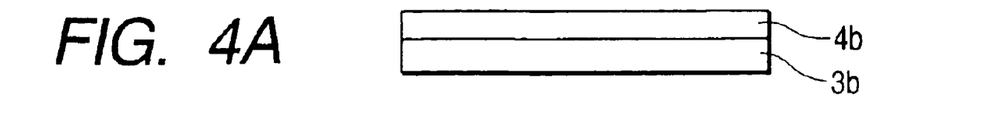
FIGS. 4A, 4B, 4C, 4D and 4E are drawings showing the process of production of the electrophoretic displaying device of the present invention.
Figure 4B:
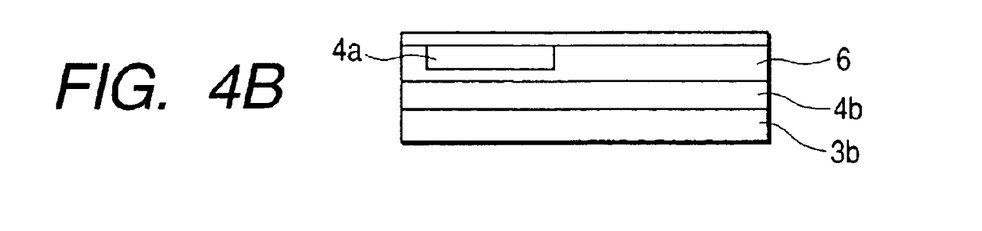
Figure 4C:
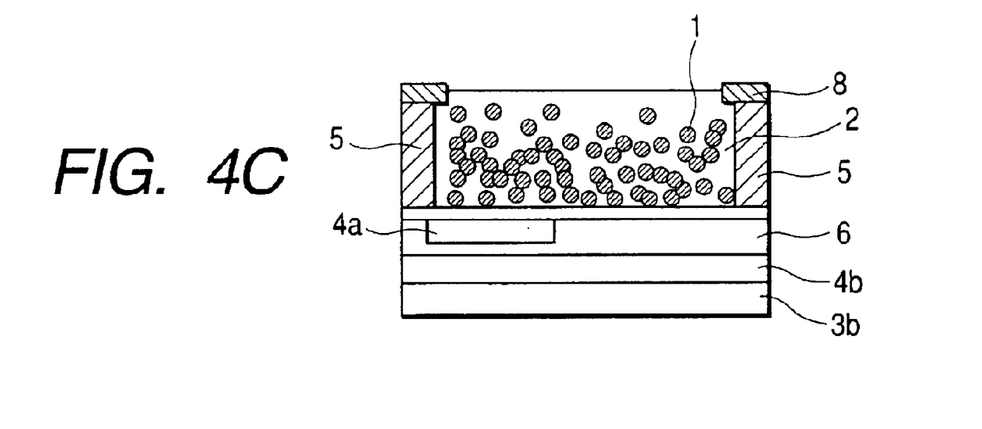
Figure 4D:
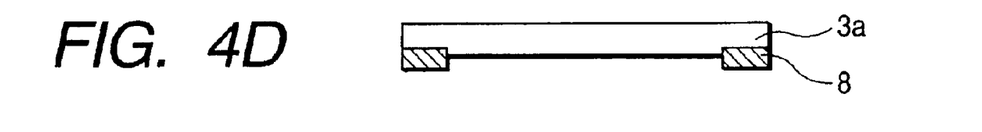
Figure 4E:
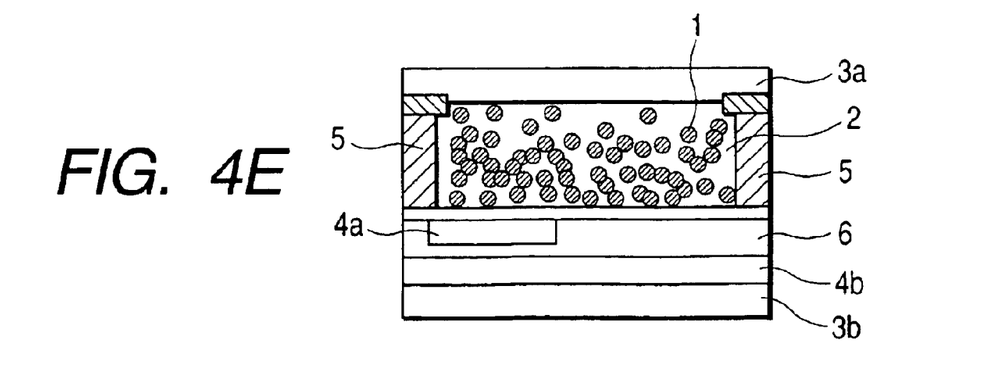

In this example, an electrophoretic displaying device was produced as shown in FIG. 4E. FIGS. 4A to 4E illustrate schematically a production flow for one of the pixels of the electrophoretic displaying device of the present invention.

A film of ITO (indium-tin oxide) was formed on a polyimide (PI) film as base plate 3b. The ITO film was patterned in lines to form a second electrode 4b (FIG. 4A). Polyimide film 3b had a size of 50 mm×50 mm and 200 μm thick.

On the surface of second electrode 4b, a polyimide resin layer whitened by mixing fine titanium oxide particles was formed as insulation layer 6.

On the surface of this insulation layer 6, first electrode 4a was formed on a part of the region of one pixel to cover partially second electrode 4b as shown in FIG. 4B. Further, insulation layer 6 was formed from transparent polyimide to cover this first electrode 4a. First electrode 4a was formed from dark black titanium carbide in a film state and patterned in lines with a line by photolithography and dry etching so as to obtain lines of 30 μm in width.

On insulation layer 6, partition walls 5 were formed to partition the pixels. Partition walls 5 were formed to a height of 40 μm by repeating steps of application of a photosensitive polyimide varnish, light exposure, and wet development, three times.

On the upper faces of partition walls 5 where base plate 3a is to be bonded, a heat-bonding adhesion layer 8 was formed. Into the room surrounded by partition walls 5, a dispersion liquid was filled which was a mixture of 1 weight part of black particles prepared in Example 1 as electrophoretic displaying particles 1, 100 weight parts of dispersing medium 2 comprised of an isoparaffin hydrocarbon, Isopar G (Exxon Co.), and 0.1 weight part of cobalt naphthenate as a charge controller (see FIG. 4C).

On light-transmissive base plate 3a consisting of PET of 200 μm thick, adhesion layer 8 was formed at the position for bonding to partition walls 5 (see FIG. 4D). After registering, base plate 3a was bonded to partition walls 5 by heating (see FIG. 4E). The upper face of first electrode 4a is visually recognized to be black, whereas the region not covered by first electrode 4a was recognized by white color of insulation color 6.

Display was conducted with the above-produced displaying device by application of voltage of ±50 V with voltage application time of 10 msec.

In this Example, electrophoretic displaying particles 1, which are electrified positively, migrate rapidly on application of a voltage onto a negatively electrified electrode. For example, with second electrode 4b electrified positively and first electrode 4a electrified negatively, black electrophoretic displaying particles 1 migrate to cover first electrode 4a, which displays visually the black color of electrophoretic displaying particles 1 and the white color of the white region (region not covered with first electrode 4a) when viewed from the observer's side of base plate 3a (see FIG. 3A). Therefore, the pixel displays a white color.

Adversely, with second electrode 4b electrified negatively and first electrode 4a electrified positively, black electrophoretic displaying particles 1 migrate onto the white region, namely the region at the outside of first electrode 4a, which displays visually the black color of first electrode 4a and the white insulation layer 6 covered with black electrophoretic displaying particles 1 when viewed from the observer's side of base plate 3a (see FIG. 3B). Therefore, the pixel displays a black color. The response speed is 30 msec or less.

Thus, displaying screen having excellent black-masking performance could be obtained by use of the electrophoretic particles of the present invention.

Example 6

In this Example, a dispersion liquid was prepared by mixing 2 weight parts of electrophoretic displaying particles 1 of white color prepared in Example 2, 100 weight parts of dispersing medium 2 comprised of Isopar G (isoparaffin hydrocarbon, Exxon Co.), and 0.5 part by weight of polyimide alkenyl succinate (OLOA1200, Shevron Chemical Co.) as a charge controller.

Second electrode 4b was formed further thereon from dark black titanium carbide. Thereon, insulation layer 6 was formed from a transparent polyimide resin. First electrode 4a was formed further thereon from titanium carbide laminated with a polyimide resin whitened by mixing fine particulate titanium oxide. An electrophoretic displaying device was produced in the same manner as in Example 5 except the aforementioned conditions.

Display was conducted with the produced electrophoretic displaying device by application of voltage of ±50 V with voltage application time of 10 msec.

In this Example, electrophoretic displaying particles 1, which were electrified negatively, migrate rapidly on application of a voltage onto a positively electrified electrode. For example, with second electrode 4b electrified negatively and first electrode 4a electrified positively, white electrophoretic displaying particles 1 migrate to cover the portion of white first electrode 4a, which displays visually the white color of electrophoretic displaying particles 1 and the black region (, i.e. region not covered with first electrode 4a) when viewed from the observer's side of base plate 3a. Thereby the pixel displays a black color.

Adversely, with second electrode 4b electrified positively and first electrode 4a electrified negatively, white electrophoretic displaying particles 1 migrate onto the black region, namely the region at the outside of first electrode 4a, which displays visually the white color of first electrode 4a and the black second electrode covered with white electrophoretic displaying particles 1 when viewed from the observer's side of base plate 3a. Thereby the pixel displays a white color. The response speed was 30 msec or less.

Thus in this Example, displaying screen having excellent white-masking performance could be obtained.

Example 7

Electrophoretic displaying particles 1 were used which contained respectively a yellow pigment, a magenta pigment, or a cyan pigment.

The pixels were arranged in lines in the order of yellow, magenta and cyan of electrophoretic display particles 1, one by one. An electrophoretic displaying device was produced in the same manner as in Example 5 except the above conditions.

Sharp color display was confirmed owing to excellent color-masking performance of electrophoretic displaying particles 1 of this Example.

Example 8

Electrophoretic displaying particles 1 were used which contained respectively a red pigment, a green pigment, or a blue pigment. The pixels were arranged in lines in the order of red, green and blue of electrophoretic display particles 1, one by one.

An electrophoretic displaying device was produced in the same manner as in Example 6 except the above conditions.

Comparative Example 1

Electrophoretic displaying particles 1 containing a white pigment were prepared in the same manner as in Example 1 except that resin dispersion liquid A in Example 1 was replaced by resin dispersion liquid A1. The particles were spread over a plane. The particles were observed visually and found to display a white color with transparency feeling.

Comparative Example 2

Electrophoretic displaying particles were prepared in the same manner as in Example 1 except that resin dispersion liquid A was replaced with carbon black. An electrophoretic displaying device was produced in the same manner as in Example 5 except the use of the carbon black in place of resin dispersion liquid A. As the result, the displayed blackness was lighter since the pigment itself was used as the migration particles.

What is claimed is:

1. Electrophoretic displaying particles comprised of a resin and pigment granules enclosed therein, having an average particle size ranging from 0.1 μm to 20 μm, wherein said pigment granules has two or more frequency maximums in granule diameter distribution.

2. The electrophoretic displaying particles according to claim 1, wherein, of the two or more frequency maximums, at least one maximum for the smaller granule diameter has higher frequency than the maximum for the largest granule diameter has.

3. The electrophoretic displaying particles according to claim 1, wherein the pigment granules are comprised of a mixture of two or more kinds of pigment granules having different average granule diameters.

4. The electrophoretic displaying particles according to claim 3, wherein the pigment granules are a mixture of two kinds of pigment granules, and one kind of granules of pigment A has an average granule diameter ranging from 100 nm to 1 μm, and the other kind of granules of pigment B has an average granule diameter ranging from 5 nm to 100 nm; and the mixing ratio of pigment A/pigment B ranging from 5/95 to 95/5.

5. The electrophoretic displaying particles according to claim 1, wherein an average granule diameter of the pigment granules ranges from 0.005 μm to 6 μm.

6. The electrophoretic displaying particles according to claim 1, wherein the electrophoretic displaying particles contain the pigment at a content ranging from 2% to 90% by weight.

7. The electrophoretic displaying particles according to claim 1, wherein the pigment granules have a relative average granule diameter of not more than 4 in comparison with the average particle size of the electrophoretic displaying particles taken as 10.

8. A dispersion liquid for electrophoretic display, comprised of the electrophoretic displaying particles set forth in claim 1 and a dispersing medium.

9. An electrophoretic displaying apparatus, employing electrophoretic particles and a dispersing medium for dispersing the electrophoretic particles for conducting display by causing migration of the electrophoretic particles by application of a voltage between electrodes, wherein the electrophoretic displaying particles set forth in claim 1 are employed as the electrophoretic particles.

* * * * *

UNITED STATES PATENT AND TRADEMARK OFFICE
CERTIFICATE OF CORRECTION

PATENT NO. : 6,882,463 B2
DATED : April 19, 2005
INVENTOR(S) : Taiko Motoi et al.

It is certified that error appears in the above-identified patent and that said Letters Patent is hereby corrected as shown below:

Column 1,
Line 20, "lizes" should read -- lize --.

Column 3,
Line 22, "drawing" should read -- drawings --.

Column 5,
Line 44, "granules" should read -- granule --.

Column 8,
Line 12, "solvent" should read -- solvents --.

Column 14,
Line 27, "(," should be deleted; and
Line 28, "i.e." should read -- (i.e. --.

Column 15,
Line 19, "has" should read -- have --; and
Line 25, "has." should be deleted.

Signed and Sealed this

Twenty-eighth Day of March, 2006

JON W. DUDAS
*Director of the United States Patent and Trademark Office*